No. 755,957. PATENTED MAR. 29, 1904.
C. J. STENE.
AXLE LUBRICATOR.
APPLICATION FILED SEPT. 4, 1903.
NO MODEL.

Witnesses
Charles Morgan.
Fred C. Jones.

Inventor
C. J. STENE.
by
Chandlee & Chandlee
Attorneys

No. 755,957.                                              Patented March 29, 1904.

UNITED STATES PATENT OFFICE.

CHRISTOPHER J. STENE, OF ASHBY, MINNESOTA.

AXLE-LUBRICATOR.

SPECIFICATION forming part of Letters Patent No. 755,957, dated March 29, 1904.

Application filed September 4, 1903. Serial No. 171,904. (No model.)

*To all whom it may concern:*

Be it known that I, CHRISTOPHER J. STENE, a citizen of the United States, residing at Ashby, in the county of Grant, State of Minnesota, have invented certain new and useful Improvements in Axle-Lubricators; and I do hereby declare the following to be a full, clear, and exact description of the invention, such as will enable others skilled in the art to which it appertains to make and use the same.

This invention relates to lubricators for axles; and it has for its object to provide a lubricator which will permit of lubrication of the axle without removing the wheel therefrom, a further object of the invention being to provide a construction which will facilitate the process of replenishing the supply of lubricant and which will permit of easy substitution of a different lubricant when desired.

Figure 1:
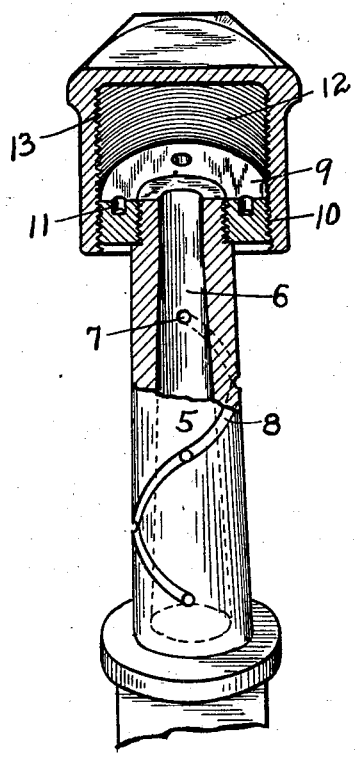
Figure 2:
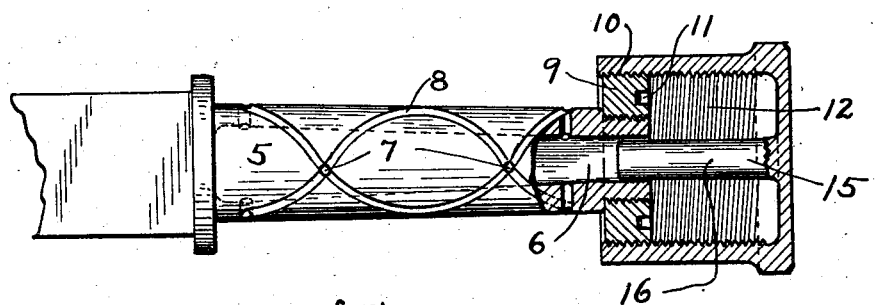

In the drawings forming a portion of this specification, in which like numerals of reference indicate similar parts in the several views, Figure 1 is a sectional perspective view showing an axle having a lubricator embodying the present invention. Fig. 2 is a longitudinal section through an axle having a lubricator embodying the present invention, and particularly designed for the use of an oil as distinguished from a grease.

Referring now to the drawings, there is shown the spindle 5 of an axle, which spindle has a longitudinal central passage 6, which extends inwardly from the outer end thereof and with which passage communicate perforations 7, that connect at their outer ends with the peripheral passages 8, which latter are designed to convey lubricant to different portions of the inner face of a hub, which may be disposed upon the spindle. The outer end of the spindle is threaded, and engaged with such thread is a cylindrical nut 9, having peripheral threads 10 and having in its front face the perforations 11 for engagement of a wrench for adjusting the nut.

A reservoir 12 in the form of a cylindrical cap is provided, having internal threads 13, and in this reservoir is placed a quantity of grease with which the axle is to be lubricated, the reservoir or cap being then screwed onto the nut 9. As the cap is screwed onto the nut the grease in the cap is compressed and is forced into and through the passage 6 and the perforation 7 to the surface of the spindle of the axle. When additional lubricant is to be supplied to the axle, the reservoir or cap is screwed farther onto the nut to force more lubricant therefrom. When a new supply of lubricant is to be provided, the reservoir or cap is unscrewed from the nut and is filled with the lubricant. Owing to the fact that the reservoir is detachable the lubricant may be supplied thereto with great facility, after which the reservoir is reëngaged with the nut.

When oil is to be used as the lubricant, a different specific style of reservoir is employed, which is shown at 15 in Fig. 2. The reservoir in this case has a central stud 16, which projects from the inner face of the outer end of the reservoir and is designed to fit in the passage 6 with a tightness sufficient to prevent flow of lubricant from the reservoir into the passage under normal conditions and to permit of flow when the lubricant in the reservoir is under pressure. Under ordinary circumstances there is little, if any, flow of oil, and when the axle is to be lubricated the cap or reservoir is screwed down onto the nut and the oil is pressed or forced between the adjacent surfaces of the stud and spindle in quantities determined by the amount of adjustment of the nut.

With the present arrangement it will be seen that one style of reservoir may be easily and quickly substituted for the other.

What is claimed is—

The combination with a spindle having a longitudinal central passage and perforations leading from the outer face of the spindle to the passage, said spindle being exteriorly threaded at its outer end, of a cylindrical hub-retaining nut screwed onto the end of the spindle and having exterior threads, and a lubricant-reservoir screwed onto the nut and communicating with the passage in the spindle, said reservoir having a stud fitted in the passage of the spindle with a tightness sufficient to prevent flow of lubricant from the reservoir into the passage under normal conditions and to permit of such flow when the lubricant in the reservoir is under pressure.

In testimony whereof I affix my signature in presence of two witnesses.

CHRISTOPHER J. STENE.

Witnesses:
 HARALD BOEN,
 ALVIN BOEN.